Patented Dec. 30, 1941

2,268,395

UNITED STATES PATENT OFFICE 2,268,395

QUATERNARY AMMONIUM COMPOUNDS

Clyde O. Henke, Wilmington, Del., and Josef Piki, Pitman, N. J., assignors to E. I. du Pont de Nemours & Company, Wilmington, Del., a corporation of Delaware No Drawing. Application August 9, 1938, Serial No. 223,830

15 Claims. (Cl. 260—404)

This invention relates to novel quaternary ammonium compounds which are useful as reagents in the treatment of textile fiber. More particularly this invention deals with quaternary ammonium compounds of the general formula R—CONH—CH$_2$—N(tert)—X, wherein R is an aliphatic radical having from 8 to 20 carbon atoms and X stands for the anion of a water-soluble strong acid. N(tert) in this formula designates the molecule of a tertiary amine, whose limitations will be more apparent from the discussion hereinbelow.

In British Patent No. 475,170, are described compounds corresponding to the above general formula, except that N(tert) is defined therein as embracing pyridine, a C-alkyl pyridine or quinoline. The compounds of this group are characterized by being solids, soluble in water, giving solutions which foam readily on shaking, and being useful as agents in textile treatment processes. They are prepared by reacting an amido-methylol compound of the general formula R—CONHCH$_2$OH with the hydrochloride, or equivalent salt, of pyridine, a C-alkyl pyridine or quinoline. Alternatively, the initial amido-methylol compound may be replaced by a mixture of the corresponding fatty-acid-amide (RCONH$_2$) and paraformaldehyde.

Unfortunately, the above method does not succeed when applied to a similar synthesis wherein N(tert) is an aliphatic tertiary amine in general. In particular, when the hydrochloride of triethyl-amine or triethanol-amine is employed in lieu of pyridine hydrochloride in the above reaction, no reaction whatever is observed under the conditions set forth in said patent. Obviously then, the reaction is not of a general nature.

It is accordingly an object of this invention to provide a process for preparing quaternary compounds of the above general formula wherein N(tert) designates the molecule of a tertiary aliphatic amine. By tertiary aliphatic amine for the purpose of this invention we mean an amine in which at least one hydrogen atom is replaced by an aliphatic radical, while the other two hydrogen atoms are replaced by individual alkyl or aralkyl radicals or by the radical of a cyclo-aliphatic compound. As typical examples of such tertiary aliphatic amines may be mentioned trimethyl-amine, triethylamine, methyl-diethylol-amine, benzyl-dimethyl amine, methyl piperidine and methyl morpholine. Other and further important objects of this invention will appear as the description proceeds.

Now according to our invention, quaternary aliphatic ammonium compounds of the above general formula are prepared by reacting with an alkylating agent upon a tertiary amino compound of the general formula

wherein R is an aliphatic radical containing from 8 to 20 carbon atoms while R$_1$ and R$_2$ represent individual alkyl radicals or jointly stand for a cycloaliphatic radical, as in the case of piperidine or morpholine.

Moreover, we have found to our surprise that the process of British Patent No. 475,170, above mentioned, although inoperative when salts of tertiary aliphatic amines in general are considered, does proceed with surprising smoothness when applied to the hydrochloride, or equivalent salt, of a tertiary aliphatic amine having no more than 5 carbon atoms in its structure. Typical illustrations of such amines are, for instance, trimethyl-amine, dimethyl-ethylamine, dimethyl-ethanol-amine, methyl-diethanol-amine and methyl-morpholine. Accordingly, this observation provides an alternative method for synthesizing compounds of the above general formula, wherein N(tert) is a lower aliphatic tertiary amine, that is one having a total of not more than 5 carbon atoms in its structure.

Furthermore, we have succeeded in simplifying considerably the last mentioned process when applied to said lower tertiary amines as defined, particularly as regards to manipulation and choice of solvent. More particularly, we have found that the reaction in the case of compounds under consideration in this synthesis may be effected simply by kneading the reactants together in the absence of any solvent whatever or in the presence of a very small quantity of solvent or of a small quantity of a free tertiary base which apparently acts as a catalyst and also serves to soften the mass being kneaded.

Finally, in the synthesis last mentioned, we may apply the modification already indicated in said British Patent No. 475,170, in the sense that in lieu of starting with an amido-methylol compound we may use in its place the corresponding fatty acid amide jointly with paraformaldehyde.

The two alternative syntheses last mentioned have the effect of singling out the compounds of the above general formula wherein N(tert) is a lower aliphatic tertiary amine into a particular subgroup which may be manufactured with a particular degree of economy. This subgroup may be defined by the more limited formula

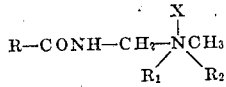

wherein R and X have the same significance as above, while $R_1$ and $R_2$ individually represent methyl, ethyl, ethanol or jointly represent the morpholine radical

We accordingly consider this group of compounds as a particular subgenus of our invention.

This group of compounds is characterized in general by the same properties as the corresponding pyridinium derivatives of said British Patent No. 475,170. More particularly, they are waxy solids, soluble in warm water to give solutions which foam readily on shaking. Addition of alkalis to such solutions, however, decompose the novel products, causing precipitation of some solid materials which are no longer soluble in water. When applied to textile fiber, they endow the latter with a soft feel. But the most outstanding and commercially important characteristic of our novel group of compounds is that when textile fabric, especially cotton, is impregnated with these compounds from aqueous bath, then dried and exposed to an elevated temperature (from 100 to 170° C.) in an oven with rapid air circulation, the fabric acquires a water-repellent finish which is permanent in the sense that it is not readily removable by laundering in the presence of soap and alkali. By this characteristic our novel compounds can be readily distinguished from other quaternary-ammonium derivatives of related structure except having a longer alkylene radical between the two nitrogen atoms.

Considering now the above indicated processes in greater detail, the first mentioned process involves reaction between a compound of the general formula

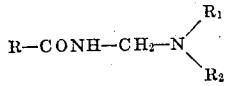

and an alkylating agent. The radical RCONH represents the radical of a fatty acid amide which may be selected from any of the long chain fatty acids, for instance those containing from 8 to 20 carbon atoms in their structure. As particular illustrations of such fatty acids may be mentioned stearic acid, oleic acid, palmitic acid, lauric acid, or the fatty acids of coconut oil, palm oil, cottonseed oil or tallow, or the derived acids such as those obtained from hydrogenated fats. R—CONH may also designate an acyl-ureido radical, for instance the radical of stearoyl urea, $C_{17}H_{35}CONH$—CONH.

As examples of $R_1$ and $R_2$ may be mentioned methyl, ethyl, propyl, ethanol or any other short chain aliphatic radical, that is, one having less than 4 carbon atoms. $R_1$ and $R_2$ may also represent jointly the penta-methylene radical, as in the case of piperidine.

The tertiary amines of the above general formula which are employed as initial material in this process may be prepared by the customary methods of the art: (See, for instance, U. S. Patent 1,952,008 and French Patent 812,073.)

As alkylating agents, any of the known alkylating or aralkylating agents may be used, for instance dimethyl sulfate, methyl iodide, methyl chloride, benzyl chloride, chlorhydrine, ethyl chloro-acetate. The reaction usually proceeds at room temperature. High temperatures should be avoided because of the sensitivity of these compounds.

With reference to the alternative processes mentioned in connection with the lower tertiary aliphatic amines, this reaction may be expressed by the equation

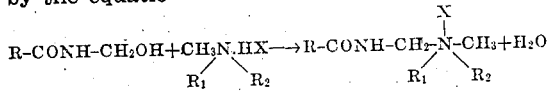

wherein R, $R_1$, $R_2$ and X have the same significance as above. The reaction may be carried out in a solvent such as benzene, ethylene dichloride or methyl-ethyl-ketone. The temperature of the reaction in this case may be between 50 and 90° C. The presence of a free tertiary base is not necessary for the reaction. A small amount of such free tertiary base, however, is beneficial in that it acts as a catalyst and improves the quality of the reaction product, especially when, as is indicated above, the amido methylol compound is replaced by a mixture of the free amide and paraformaldehyde.

Tertiary-amine-salts suitable for this reaction are, for instance, the hydrochlorides or hydrobromides of dimethylethylamine, trimethylamine, dimethyl-ethanol-amine, methyl-diethanol-amine and methyl-morpholine. It appears that the nitrogen atom must contain at least one methyl group if the salt thereof is to react satisfactorily with the amido-methylol compound. As fatty acid amides or amido-methylols for this reaction, the same variation is permissible as in the synthesis first mentioned above.

As already indicated, the alternative process hereinabove described may be carried out either in the complete absence or in the presence of only a small amount of a solvent, using a rotary dough mixer. This process means a considerable saving in the production of these products, as only a single operation is necessary. It also avoids filtration and recovery of solvents.

The process in this case is carried out by mixing molecular proportions of the methylol-amide and the tertiary amine salt at a temperature of 50 to 100° C. in a kneading machine of the Werner and Pfleiderer type. The reaction temperature is chosen so that thorough mixing is assured during the reaction. The dry reactants, that is the methylol-amide and the tertiary amine salt (or in the alternate method, the amide, paraformaldehyde and the tertiary amine salt) are mixed thoroughly and heated until a plastic mass results. The temperature at which the mass becomes soft will depend greatly upon the melting point of the fatty-acid amide used. After the mass has become soft, the reaction temperature may be lowered, as long as the mass remains plastic enough to assure good contact between the reacting compounds. In order to obtain the best results, it is advisable to have an excess of the aldehyde and of the tertiary amine salt present. The excess of each of the two ingredients may vary from a few percent to two and three times the molecular quantity. A small amount of free tertiary base is also advantageous during the reaction, to act as catalyst.

Tertiary bases which are suitable for the latter purpose are for instance pyridine, triethylamine, trimethylamine, triethanolamine, tributylamine, methyl piperidine, and homologs of pyridine. A small amount of a solvent may be employed during the reaction. This tends to lower the viscosity of the reaction mass, thus enabling one to carry out the reaction at a lower temperature. This is an advantage, because temperature above 100° C. tend to decompose the quaternary ammonium compound formed in the reaction. Suitable solvents for this purpose are methyl-ethyl-ketone, diethyl-ketone, glycerine, ethylene-glycol and other inert liquid, organic compounds. The time required for this reaction is from 2 to 12 hours, the best product being obtained after about 5 hours.

In order to take up the water which is formed during the reaction, an anhydrous salt like sodium sulfate or magnesium sulfate may be added at the beginning or during the reaction. The mixer may be made of iron, stainless steel or nickel, or it may be lined with a more resistant metal, such as silver, tantalum or chromium.

Without limiting our invention to any particular procedure the following examples in which parts by weight are given will serve to illustrate our preferred mode of operation.

*Example 1.*—35 parts of stearamido-methyl-dimethylamine (which may be prepared by condensing stearamide with formaldehyde and dimethylamine) are suspended in 75 parts of ethyl ether, cooled to about −30° C., and 10 parts of liquid methyl chloride are added. This mixture is warmed in a pressure vessel for five hours to 40° C. Upon removal of the solvent, a water-soluble product is obtained which dissolves in warm water to a somewhat cloudy solution, having forming properties. It dissolves also in warm methyl alcohol, methyl-ethyl-ketone and benzene. The reaction product is believed to be stearamido-methyl-trimethyl-ammonium chloride, of the formula

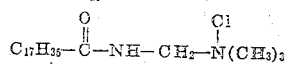

When the aqueous solution of this product is made alkaline with a base like sodium carbonate or sodium hydroxide, a precipitate is quickly formed which is insoluble in neutral or acidified water. The filtrate of this precipitate has lost all its foaming characteristics.

If cotton material is impregnated with an aqueous solution of this product and then heated to a temperature between 100° to 170° C. in an oven with rapid air circulation, the material acquires a water-repellent finish which is permanent in the sense that it is not removed by laundering in the presence of soap and alkali.

*Example 2.*—To a solution of 17 parts of stearamido-methyl-dimethyl-amine in 200 parts of ether, are added 5 parts of methyl iodide, and the clear solution is allowed to stand at room temperature. After a short time the solution becomes turbid and a slightly yellowish product can be filtered off which dissolves in warm water to a viscous solution. It dissolves also in methyl alcohol and methyl-ethyl-ketone, like the product described in Example 1. Its behavior towards inorganic bases is also the same. The product is believed to be stearamido-methyl-trimethyl-ammonium-iodide, having, most likely, the following formula:

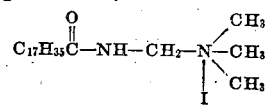

*Example 3.*—17 parts of stearamidomethyl-dimethylamine are dissolved in 200 parts of ether, and 7 parts of dimethyl-sulfate are added. After standing at room temperature for a short time, a white reaction product separates out which dissolves in hot water to a clear solution. The product is most probably stearamido-methyl-trimethyl-ammonium-methyl-sulfate.

*Example 4.*—18 parts of stearamidomethyl-dimethylamine are dissolved in 200 parts of ether, and 9 parts ethylene-chlorohydrine are added. Upon standing at room temperature for several days, a considerable amount of crystals separate which are soluble in warm water. This product is probably stearamido-methyl-dimethyl-ethylol-ammonium chloride.

*Example 5.*—The procedure is the same as in Example 4, but instead of the ethylene chlorhydrine therein mentioned, 7.6 parts of benzyl-chloride are used. A quaternary ammonium compound is formed which contains a benzyl group attached to the nitrogen atom, and is probably stearamido-methyl-dimethyl-benzyl-ammonium chloride.

In a similar manner other alkylating agents may be employed, for instance epi-chlorhydrine or methyl-paratoluene sulfonate.

*Example 6.*—11.0 parts of stearamidomethyl-piperidine were dissolved in 50 parts of ether and 3.8 parts of benzyl chloride were added. This mixture was then heated in a sealed container for 8 hours to 82° C. A precipitate was formed in the ether solution, which dissolved in warm water to give a viscous, foaming solution. This product is believed to be stearamido-methyl-benzyl-piperidinium chloride.

*Example 7.*—30 parts of stearamidomethyl-diethylamine were dissolved in 100 parts of ether and 10.8 parts of dimethyl sulfate were added. After standing for a few hours at room temperature, the solvent was removed by evaporation. The residue dissolved in water to give a strongly foaming, clear solution. The product is believed to be stearamidomethyl-diethyl-methyl-ammonium-(methyl-sulfate).

The products of Examples 2 to 7 above render cellulosic fiber water repellent, if the latter is impregnated with an aqueous solution of these products and then dried in an oven with rapid air circulation.

*Example 8.*—A mixture of 135 parts of stearamido-methylol, ($C_{17}H_{35}CONH-CH_2OH$) 77 parts of trimethylamine hydrochloride, and 800 parts of ethylene-dichloride, are heated for 16 hours to 60° C. The solution is filtered while hot, and the filtrate is allowed to cool. The white product which separates from the filtrate on cooling is substantialy identical with that obtained in Example 1. It dissolves in warm water to a somewhat cloudy solution which has foaming properties and renders cotton material permanently water-repellent, if the latter is impregnated therewith and heated to a temperature of 100 to 170° C. in an oven with rapid air circulation.

Instead of the methylol-stearamide, the methylol compounds of other amides or mixtures of amides may be used, for instance, the ones obtainable from coconut oil acids, the fish oil acids, or oleic acid.

*Example 9.*—A mixture of 54 parts of stearamide, 20 parts trimethylamine hydrochloride, 6.6 parts of paraformaldehyde, and 5 parts of triethylamine, are heated in 400 parts of ethylene-dichloride for 24 hours to 60° C. After this time the mixture is filtered hot and the filtrate is cooled. The white crystalline product which separates out is filtered off and washed with acetone. It emulsifies well in hot water, has foaming properties, and imparts water-repellent properties to cotton textile, fast to washing, when applied as described in Example 1.

*Example 10.*—60 parts of methylol-stearamide are mixed with 400 parts of ethylene-dichloride and 47 parts of methyl-morpholine hydrochloride. The mixture is heated to 60° C. for 24 hours. Upon cooling, 93 parts of a white product is obtained which dissolves in warm water and has strong foaming properties. It probably corresponds to the formula

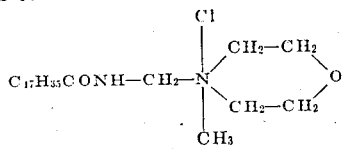

If the methyl-morpholine-hydrochloride in the above reaction is replaced by 43 parts of dimethyl-ethylol-amine hydrochloride, a product is obtained which probably has as its main constituent stearamidomethyl-dimethyl-ethylol-ammonium chloride.

*Example 11.*—52 parts of trimethyl-amine and 32 parts of hydrogen chloride were passed into 300 parts of methyl-ethyl-ketone at room temperature; then 134 parts of stearamide and 21 parts of paraformaldehyde were added. The whole mass was heated for 8 hours to 75 to 80° C. During the reaction a slight excess of trimethylamine was maintained. Upon cooling down to room temperature, a white product was obtained which dissolved in warm water and which imparted permanently water-repellent properties to cellulose when the latter was impregnated with an aqueous solution thereof and then heated for a few minutes to 120° C. in an oven with rapid air circulation. The product is probably identical with that obtained in Example 1.

*Example 12.*—221 parts of stearamide and 36 parts of paraformaldehyde were suspended in 720 parts of methyl-ethyl-ketone and then a small quantity of trimethyl-amine was added, sufficient to make the mass alkaline to brilliant yellow. The mass was then heated for 14 hours to 75 to 80° C. After cooling down to room temperature, more trimethyl-amine was added, until a total of 115 parts have been absorbed. Hydrogen chloride gas was passed in at the same time until 60 parts were added. Then the reaction mass was heated again for 6 hours to 75 to 80° C., keeping the reaction mass slightly alkaline to brilliant yellow all the time. Upon cooling and filtering, an almost colorless product was obtained which dissolved in warm water and which had the same properties as the product described in Example 1.

*Example 13.*—59 parts of trimethylamine were passed into 800 parts of ethylene-dichloride at a temperature around 0° C. Then hydrogen chloride gas was passed in until the mass was acidic to litmus paper. To this finely divided trimethyl-amine-hydrochloride suspension, 135 parts of methylol-stearamide were added and the mixture was heated to 60° C. for 16 hours. Upon cooling to room temperature, a white product was obtained which dispersed well in warm water, and resembled otherwise the product obtained in Example 1.

*Example 14.*—30 parts of methylol-stearamide were suspended in 250 parts of ethylene dichloride, then 14.6 parts of dimethyl-ethyl-amine-hydrochloride and 0.2 part of triethylamine were added. After heating for 10 hours to 60° C., the ethylene dichloride solution was filtered warm, and the filtrate evaporated to dryness. The residue was soluble in water and had strong foaming properties. It is believed to be stearamido-methyl-dimethyl-ethyl-ammonium chloride.

*Example 15.*—9.8 parts of stearoyl urea ($C_{17}H_{35}CONH—CONH_2$) melting at 178° C. is suspended in 125 parts of ethylene dichloride and then 2.2 parts of paraformaldehyde, 5.5 parts of dimethyl-ethyl-amine hydrochloride and 0.4 part of triethylamine are added. After stirring for a few hours at 60° C., the otherwise exceedingly insoluble ureide becomes water-soluble. The aqueous solution possesses strong foaming properties and renders cellulosic material water repellent when the latter is impregnated with this solution and dried in an oven with rapid air circulation at a temperature of 120 to 150° C. The reaction product is believed to be stearo-ureido-methyl-dimethyl-ethyl-ammonium chloride, of the formula

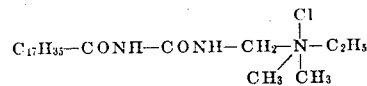

*Example 16.*—A mixture of 54 parts of stearamide, 20 parts trimethylamine hydrochloride, and 10 parts of paraformaldehyde, are heated to between 50 and 100° C. while being mixed intimately for five hours. The reaction product is water-soluble and has pronounced foaming properties. When cotton is treated with an aqueous solution of this product as described in Example 1, it becomes permanently water-repellent. A small amount of a free tertiary base like pyridine or triethylamine may be used in the above example as a catalyst.

*Example 17.*—65 parts of stearamide, 36 parts of trimethylamine hydrochloride and 12 parts of paraformaldehyde were intimately mixed in a rotary dough mixer and then 3 parts of pyridine were added. The whole mass was heated to between 80 and 85° C. for 8 hours. After cooling down to room temperature, a waxy solid was obtained which could be converted into a granular product when mixed with sodium sulfate or magnesium sulfate. Otherwise, the product appeared to have the same properties as that in Example 1.

*Example 18.*—54 parts of stearamide were mixed in a rotary dough mixer for five hours to 80 to 90° C. with 30 parts of trimethylamine hydrochloride, 12 parts of paraformaldehyde, and 24 parts of dry magnesium sulfate. The reaction product was a hard mass when cool, and could be readily pulverized. The active ingredient in this product was probably the same as described in Example 1.

*Example 19.*—65 parts of stearamide were mixed in a rotary dough mixer with 36 parts of trimethylamine hydrochloride, 12 parts of paraformaldehyde, 15 parts of glycerine, and 1 part of pyridine for 5½ hours at a temperature of 85 to 88° C. The reaction product showed improved solubility in water over that described in the preceding examples, but seemed otherwise identical therewith.

*Example 20.*—64 parts of stearamide were mixed in a rotary dough mixer with 10 parts of paraformaldehyde and 45 parts of methyl-diethylol-amine hydrochloride for four hours to 80 to 90° C. A waxy solid was obtained which dispersed well in warm water, but had otherwise the same principal properties as the product described in Example 1, including the power to impart water-repellency. The compound formed is believed to be a quaternary compound of the formula

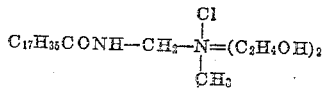

Example 21.—A mixture of 56 parts stearamide, 25 parts trimethylamine hydrochloride, 8 parts paraformaldehyde and 2 parts of pyridine are mixed in a heavy duty mixer at 80 to 100° C. for a period of 5 to 10 hours. On cooling the mass breaks up into small particles which form a cloudy solution with warm water. The product is substantially identical with that obtained in the preceding examples. By treatment of cotton cloth with the solution as described in the preceding examples, it is made permanently water-repellent.

In the above example pyridine may be replaced with triethylamine, trimethylamine, triethanolamine and other tertiary amines.

Example 22.—A mixture of 56 parts stearamide, 19 parts trimethylamine hydrochloride, 8 parts paraformaldehyde and 19 parts of a 20% solution of trimethylamine in methyl-ethyl-ketone is mixed in a heavy duty mixer at 60 to 100° C. for a period of 5 to 10 hours. On cooling the product breaks up into small particles which disperse well in water, and appears to be identical with the product obtained in the preceding examples.

In lieu of the lower tertiary aliphatic amine hydrochloride employed in Examples 8 to 22, inclusive, other salts of the same tertiary amines with strong, monobasic acids may be employed, for instance, thimethylammonium nitrate or the trimethyl ammonium salt of meta-nitro benzene sulfonic acid.

It will be understood that many other variations and modifications may be made in the details of the procedure without departing from the spirit and scope of this invention.

For the purpose of this application and the claims hereinbelow, the phrase "soluble in warm water" or "dissolving in warm water" shall be understood as implying a solubility of at least 2 gms. of substance per 100 cc. of water taken at a temperature of about 40° C., these being respectively near the higher concentration limits and about the average temperature of the aqueous bath employed in practice when quaternary ammonium compounds of this general class are used for treating fabric for water-repellency purposes. See for instance British Patent No. 477,991.

We claim:

1. A compound of the general formula

R—CONH—CH₂—N(tert)—X

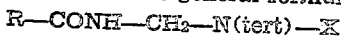

wherein R is an aliphatic radical containing from 8 to 20 carbon atoms, X stands for the anion of a monobasic, water-soluble acid, while N(tert) designates an aliphatic tertiary amine having at least one methyl radical attached to the N-atom, said compound being characterized by dissolving in warm water to give a foaming solution which is unstable toward alkali but which when applied to cotton fabric followed by heating the latter in an oven with rapid air circulation imparts to said fabric a water-repellent finish substantially fast to laundering.

2. A compound of the general formula

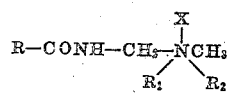

wherein R stands for an aliphatic radical having from 8 to 20 carbon atoms, X stands for the anion of a monobasic, water-soluble acid, while R₁ and R₂ represent aliphatic radicals having jointly not over 4 carbon atoms, said compound being characterized by dissolving in warm water to give a foaming solution which is unstable toward alkali but which when applied to cotton fabric followed by heating the latter in an oven with rapid air circulation imparts to said fabric a water-repellent finish substantially fast to laundering.

3. A compound of the general formula

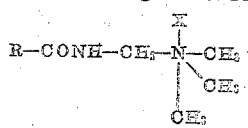

wherein R is an aliphatic radical containing from 8 to 20 carbon atoms, while X stands for the anion of a monobasic, water-soluble acid, said compound being characterized by dissolving in warm water to give a foaming solution which is unstable toward alkali but which when applied to cotton fabric followed by heating the latter in an oven with rapid air circulation imparts to said fabric a water-repellent finish substantially fast to laundering.

4. A compound of the general formula

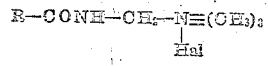

wherein R is an aliphatic radical containing from 8 to 20 carbon atoms, while Hal designates a halogen atom, said compound being characterized by dissolving in warm water to give a foaming solution which is unstable toward alkali but which when applied to cotton fabric followed by heating the latter in an oven with rapid air circulation imparts to said fabric a water-repellent finish substantially fast to laundering.

5. Stearamido - methyl - trimethylammonium chloride.

6. Stearamido - methyl - dimethyl - ethylol-ammonium chloride.

7. A process of producing a compound of the general formula

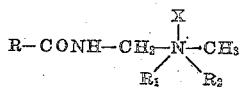

wherein R stands for an aliphatic radical having from 8 to 20 carbon atoms, X stands for the anion of a monobasic, water-soluble acid, and R₁ and R₂ represent lower aliphatic radicals having jointly not over 4 carbon atoms, which comprises reacting together an amido-methylol compound of the general formula R—CONH—CH₂OH, wherein R has the same significance as above, with a salt of a tertiary amine of the general formula

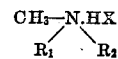

wherein R₁, R₂ and X have the same significance as above, in the presence of a free tertiary base.

8. A process as in claim 7, wherein the amido-methylol compound is formed in situ by the interaction of a fatty-acid amide of the general formula R—CONH₂, wherein R has the same significance as above, with a reagent yielding formaldehyde.

9. A process as in claim 7, the reaction being effected by kneading the reagents together in the absence of any quantities of solvent which would be sufficient to form a liquid suspension of the reaction mass.

10. A process of producing a quaternary ammonium compound of the general formula

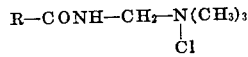

wherein R stands for an aliphatic radical having from 8 to 20 carbon atoms, which comprises kneading together in plastic state and at a temperature between 50 and 90° C., a mixture of a methylol-amide of the general formula

wherein R has the same significance as above, and trimethyl-amine-hydrochloride.

11. A process of producing a quaternary ammonium compound of the general formula

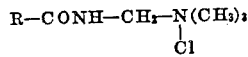

wherein R stands for an aliphatic radical having from 8 to 20 carbon atoms, which comprises kneading together in plastic state and at a temperature between 50 and 90° C., a mixture of a fatty-acid amide of the general formula R—CONH₂, wherein R has the same significance as above, paraformaldehyde, and trimethyl-amine-hydrochloride.

12. A process as in claim 10, the kneading being aided by the presence of an inert diluent in quantity insufficient to dilute the mass beyond the plastic state.

13. A process as in claim 10, the reaction mass containing further a catalytic quantity of a liquid tertiary base.

14. A process as in claim 11, the kneading being aided by the presence of an inert diluent in quantity insufficient to dilute the mass beyond the plastic state.

15. A process as in claim 11, the reaction mass containing further a catalytic quantity of a liquid tertiary base.

CLYDE O. HENKE.
JOSEF PIKL.